US007542095B2

(12) United States Patent
Zhou et al.

(10) Patent No.: US 7,542,095 B2
(45) Date of Patent: Jun. 2, 2009

(54) METHOD AND SYSTEM OF NOISE-ADAPTIVE MOTION DETECTION IN AN INTERLACED VIDEO SEQUENCE

(75) Inventors: Zhi Zhou, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 623 days.

(21) Appl. No.: 11/040,578

(22) Filed: Jan. 20, 2005

(65) Prior Publication Data

US 2006/0158550 A1 Jul. 20, 2006

(51) Int. Cl.
*H04N 5/00* (2006.01)
*H04N 7/01* (2006.01)
*H04N 9/64* (2006.01)
*H04N 11/20* (2006.01)

(52) U.S. Cl. ................... 348/452; 348/448; 348/451; 348/700; 348/701; 348/620

(58) Field of Classification Search ............ 348/448, 348/451, 452, 699–701, 910, 620
See application file for complete search history.

(56) References Cited

U.S. PATENT DOCUMENTS

| | | | | |
|---|---|---|---|---|
| 4,661,853 A | * | 4/1987 | Roeder et al. ............. | 348/701 |
| 4,933,759 A | * | 6/1990 | Van der Meer et al. ..... | 348/700 |
| 5,027,201 A | * | 6/1991 | Bernard .................. | 348/702 |
| 5,051,826 A | * | 9/1991 | Ishii et al. ............... | 348/448 |
| 5,081,532 A | * | 1/1992 | Rabii ..................... | 348/452 |
| 5,434,627 A | * | 7/1995 | Weston .................. | 348/609 |
| 5,446,501 A | * | 8/1995 | Takemoto et al. ......... | 348/620 |

(Continued)

OTHER PUBLICATIONS

Hentschel et al., "Comparison Between Median Filtering and Vertical Edge Controlled Interpolation for Flicker Reduction," IEEE Transactions on Consumers Electronics, Aug. 1989, pp. 279-289.

(Continued)

*Primary Examiner*—Brian P Yenke
(74) *Attorney, Agent, or Firm*—Kenneth L. Sherman, Esq.; Michael Zarrabian, Esq.; Myers Andras Sherman LLP

(57) ABSTRACT

A motion decision value provides a dependable estimate whether motion occurs in a given region of a video image in an interlaced video sequence. The motion detection is particularly applicable in the conversion from interlaced video to progressive video. An input first is fed to an absolute value former which computes a frame difference signal from a difference between the first field and the second field in one frame. A point-wise motion detection signal is computed based on the frame difference signal and noise in the video sequence, wherein the point-wise motion detection signal is noise-adaptive. The point-wise motion detection signal is then followed by a region-wise motion detection that combines the point-wise motion detection signal with an adjacent point-wise motion detection signal delayed by one field. The motion decision value is then computed from the region-wise motion detection signal and output for further processing in the video signal processing system, such as for choosing whether the spatially interpolated video signal value or the temporally interpolated video signal value should be used for the output.

26 Claims, 7 Drawing Sheets

U.S. PATENT DOCUMENTS

| | | | | |
|---|---|---|---|---|
| 5,534,935 A * | 7/1996 | Kawai et al. | | 348/448 |
| 5,600,377 A * | 2/1997 | David et al. | | 348/452 |
| 5,638,139 A * | 6/1997 | Clatanoff et al. | | 348/701 |
| 5,661,525 A * | 8/1997 | Kovacevic et al. | | 348/452 |
| 5,796,437 A * | 8/1998 | Muraji et al. | | 348/452 |
| 5,943,099 A * | 8/1999 | Kim | | 348/448 |
| 5,959,681 A | 9/1999 | Cho | | |
| 6,014,182 A * | 1/2000 | Swartz | | 348/700 |
| 6,037,986 A * | 3/2000 | Zhang et al. | | 375/240.12 |
| 6,061,100 A * | 5/2000 | Ward et al. | | 348/607 |
| 6,072,531 A * | 6/2000 | Shibano | | 348/448 |
| 6,108,041 A * | 8/2000 | Faroudja et al. | | 348/446 |
| 6,122,017 A * | 9/2000 | Taubman | | 348/620 |
| 6,124,900 A * | 9/2000 | Clatanoff et al. | | 348/701 |
| 6,239,842 B1 * | 5/2001 | Segman | | 348/448 |
| 6,266,092 B1 * | 7/2001 | Wang et al. | | 348/448 |
| 6,288,886 B1 * | 9/2001 | Sato et al. | | 361/302 |
| 6,295,091 B1 * | 9/2001 | Huang | | 348/448 |
| 6,307,560 B1 * | 10/2001 | Kondo et al. | | 345/619 |
| 6,317,165 B1 * | 11/2001 | Balram et al. | | 348/699 |
| 6,330,032 B1 * | 12/2001 | Boehlke | | 348/452 |
| 6,331,874 B1 * | 12/2001 | de Garrido et al. | | 348/452 |
| 6,348,949 B1 * | 2/2002 | McVeigh | | 348/452 |
| 6,414,719 B1 * | 7/2002 | Parikh | | 348/448 |
| 6,449,312 B1 * | 9/2002 | Zhang et al. | | 375/240.16 |
| 6,452,639 B1 * | 9/2002 | Wagner et al. | | 348/448 |
| 6,452,972 B1 * | 9/2002 | Ohara | | 375/240.12 |
| 6,459,455 B1 * | 10/2002 | Jiang et al. | | 348/452 |
| 6,483,546 B1 * | 11/2002 | Kondo et al. | | 348/458 |
| 6,512,550 B1 * | 1/2003 | de Garrido et al. | | 348/452 |
| 6,621,936 B1 * | 9/2003 | Kondo et al. | | 382/260 |
| 6,630,961 B1 * | 10/2003 | Shin et al. | | 348/448 |
| 6,633,612 B2 * | 10/2003 | Selby | | 375/240.16 |
| 6,636,267 B1 * | 10/2003 | Adachi | | 348/448 |
| 6,647,062 B2 * | 11/2003 | Mackinnon | | 375/240.16 |
| 6,754,371 B1 * | 6/2004 | Kondo et al. | | 382/107 |
| 6,795,123 B2 * | 9/2004 | Gotanda et al. | | 348/448 |
| 6,822,691 B1 * | 11/2004 | Kim et al. | | 348/452 |
| 6,829,013 B2 * | 12/2004 | Thompson et al. | | 348/448 |
| 6,847,405 B2 * | 1/2005 | Hsu et al. | | 348/452 |
| 6,859,237 B2 * | 2/2005 | Swartz | | 348/700 |
| 6,909,466 B1 * | 6/2005 | Scheffler et al. | | 348/459 |
| 7,265,791 B2 * | 9/2007 | Song et al. | | 348/448 |
| 2002/0027610 A1 * | 3/2002 | Jiang et al. | | 348/448 |
| 2002/0136305 A1 | 9/2002 | Kim et al. | | |
| 2003/0156301 A1 * | 8/2003 | Kempf et al. | | 358/486 |
| 2004/0184541 A1 * | 9/2004 | Brockmeyer et al. | | 375/240.16 |
| 2004/0196901 A1 * | 10/2004 | Demos | | 375/240 |
| 2004/0202245 A1 * | 10/2004 | Murakami et al. | | 375/240 |

OTHER PUBLICATIONS

D. Bagni, R. Lancini, S. Landi, and S. Tubaro, "HD-TV Spatio-Temporal Upconversion," an edge direction dependent deinterlacing method disclosed in the Proc. of the Int. Workshop on HDTV, 1994, pp. 137-146.

J. Juhola, A. Nieminen, J. Salo, and Y. Neuvo, "Scan Rate Conversions Using Weighted Median Filtering", A weighted median filter disclosed in the Proc. of the IEEE ISCAS, Portland, USA, May 1989, pp. 433-436.

A. Lehtonen and M. Renfors, "Nonlinear Quincunx Interpolation Filtering," FIR median hybrid interpolation disclosed in Pro. Of SPIE's Visual Communications and Image Processing, Lansanne, Switzerland, Oct. 1990, pp. 135-142. vol. 1360.

H. Blume, I. Schwoerer, and K. Zygis, "Subband Based Upconversion Using Complementary Median Filters," disclosed in Proc. of the Int. Workshop on HDTV, 1994, pp. 127-136.

C. Markhauser, "Motion Adaptive Pro-Scan Converter with Two-Dimensional Contour Enhancement," IEEE Transactions on Consumer Electronics, pp. 110-114, May 1990, vol. 36, No. 2.

* cited by examiner

METHOD AND SYSTEM OF NOISE-ADAPTIVE MOTION DETECTION IN AN INTERLACED VIDEO SEQUENCE

FIELD OF THE INVENTION

The present invention relates generally to motion detection in video sequences, and in particular to noise-adaptive motion detection in interlaced video sequences.

BACKGROUND OF THE INVENTION

In the development of current Digital TV (DTV) systems, it is essential to employ video format conversion units because of the variety of the video formats adopted in many different DTV standards worldwide. For example, the ATSC DTV standard system of North America adopted 1080×1920 interlaced video, 720×1280 progressive video, 720×480 interlaced and progressive video, etc. as its standard video formats for digital TV broadcasting.

Video format conversion operation is to convert an incoming video format to a specified output video format to properly present the video signal on a display device (e.g., monitor, FLCD, Plasma display) which has a fixed resolution. A proper video format conversion system is important as it can directly affect the visual quality of the video of a DTV Receiver. Fundamentally, video format conversion operation requires advanced algorithms for multi-rate system design, poly-phase filter design, and interlaced to progressive scanning rate conversion or simply deinterlacing, where deinterlacing represents an operation that doubles the vertical scanning rate of the interlaced video signal.

Historically, deinterlacing algorithms were developed to enhance the video quality of NTSC TV receivers by reducing the intrinsic annoying artifacts of the interlaced video signal such as a serrate line observed when there is motion between fields, line flickering, raster line visibility, and field flickering. This also applies to the DTV Receiver.

Elaborate deinterlacing algorithms utilizing motion detection or motion compensation allow doubling the vertical scanning rate of the interlaced video signal especially for stationary (motionless) objects in the video signal. Motion detection based deinterlacing operation can be used for analog and digital TV receivers.

A number of deinterlacing algorithms exist. Such deinterlacing algorithms can be categorized into two classes: 2-D (spatial) deinterlacing algorithms and 3-D (spatio-termporal) deinterlacing algorithms depending on the use of motion information embedded in consecutive interlaced video sequence. It is well-known that a 3-D deinterlacing algorithm based on motion detection provides more pleasing performance than a 2-D deinterlacing algorithm. The key point of a 3-D deinterlacing algorithm is precisely detecting motion in the interlaced video signals.

Existing methods disclose estimating a motion decision factor based on the frame difference signal and the sample correlation in vertical direction. These methods provide a way of reducing the visual artifacts that can arise from false motion detection by utilizing the sample correlation in vertical direction of the sampling point where the value is to be interpolated. However, such methods may not provide a true motion detection method when there are high frequency components in vertical direction. As a consequence, such methods do not increase the vertical resolution even when there is no real motion between fields. In other methods, the filtering result of the frame difference is compared with a constant value to determine the motion detection signal. However, in such methods, performance deteriorates when noise in the video sequence increases.

BRIEF SUMMARY OF THE INVENTION

The present invention addresses the above shortcomings. In one embodiment the present invention provides a method of computing a motion decision value for a video processing system, comprising the steps of: inputting a video signal with an interlaced video sequence of fields; computing a frame difference signal from a difference between a previous field and a next field in the video sequence; computing a point-wise motion detection signal based on the frame difference signal and noise in the video sequence, wherein the point-wise motion detection signal is noise-adaptive; and computing the motion decision value as a function of the point-wise motion detection signal.

In another aspect, the present invention provides a method of processing interlaced video signals, comprising the steps of: spatially interpolating a value of the video: signal at a given location from a video signal of at least one adjacent location in a given video field; temporally interpolating the value of the video signal at the given location from a video signal at the same location in temporally adjacent video fields; forming a motion decision value for the same location as discussed above; and mixing an output signal for the video signal at the given location from the spatially interpolated signal and the temporally interpolated signal and weighting the output signal in accordance with the motion decision value.

The present invention further provides systems to implement the above methods. Other embodiments, features and advantages of the present invention will be apparent from the following specification taken in conjunction with the following drawings.

DETAILED DESCRIPTION OF THE INVENTION

In one embodiment the present invention provides a robust method of estimating a noise-adaptive motion decision parameter in an interlaced video sequence. Further, the present invention provides a deinterlacing system utilizing the motion decision parameter estimation method.

In order to systematically describe the deinterlacing problem and the methods of the present invention, in the following description let $x_n$ denote the incoming interlaced video field at time instant t=n, and $x_n(v,h)$ denote the associated value of the video signal at the geometrical location (v,h) where v represents vertical location and h represents horizontal location.

Figure 1:
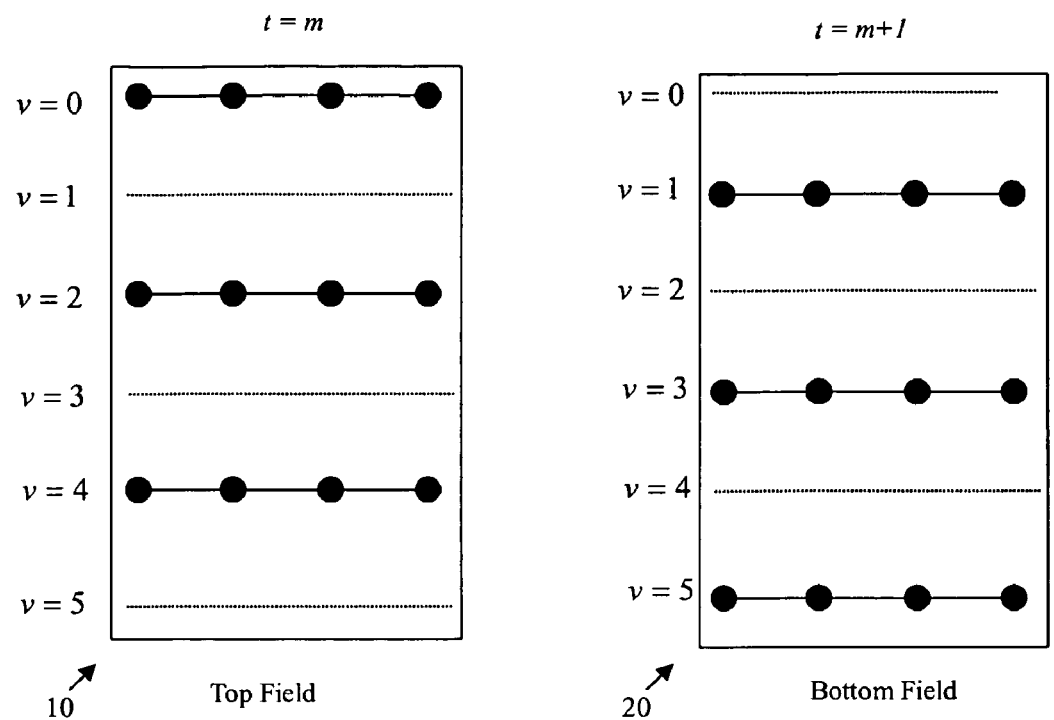
FIG. 1 is an example diagrammatic view of two juxtaposed fields of an interlaced video sequence.

Referring to the example in FIG. 1, an image at t=m represents a top field 10 and an image at t=m+1 represents a bottom field 20 of an interlaced video sequence. By the definition of a interlaced video signal, the signal values of $x_n$ are available only for the even lines, i.e., v=0, 2, 4, . . . , if $x_n$ is the top field 10. Similarly, the signal values of $X_n$ are available only for the odd lines of v (i.e., V=1, 3, 5, . . . ) if $x_n$ is the bottom field 20. Conversely, the signal values of $x_n$ are not available for odd lines if $x_n$ is a top field 10 signal and the signal values of $x_n$ are not available for even lines if $x_n$ is a bottom field 20.

Top and bottom fields 10, 20 are typically available in turn in time. It is assumed that the input interlaced video is corrupted by independent, identically distributed additive and stationary zero-mean Gaussian noise with variance $\sigma_0^2$, that is, each available signal value $x_n(v,h)$ can be denoted as $x_n(v,h)=\hat{x}_n(v,h)+\delta_n(v,h)$, where $\hat{x}_n(v,h)$ is the true pixel value without noise corruption and $\delta_n(v,h)$ is the Gaussian distributed noise component. It is further assumed that the noise variance $\sigma_0^2$ is already known, manually set or pre-detected by a separated noise estimation unit. $\sigma_0$ represents noise standard deviation.

Based upon the above description of the interlaced video signal, a deinterlacing problem can be stated as a process to reconstruct or interpolate the unavailable signal values of in each field. That is, the deinterlacing problem is to reconstruct the signal values of $x_n$ at odd lines (v=1, 3, 5, . . . ) for top field $x_n$ and to reconstruct the signal values of $x_n$ at even lines (v=0, 2, 4, . . . ) for bottom field $x_n$.

Figure 2:
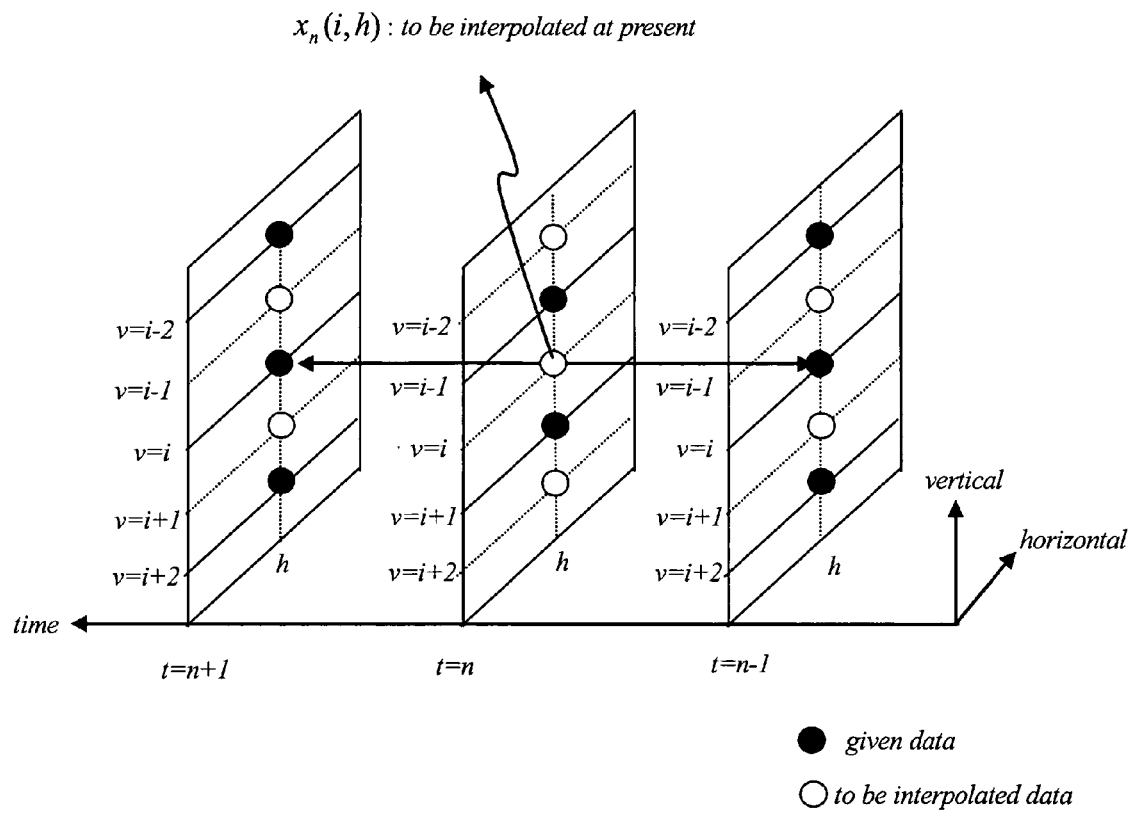
FIG. 2 is an example diagrammatic illustration of three fields serving to describe the deinterlacing problem according to an embodiment the present invention.

For clarity of description herein, the deinterlacing problem is simplified as a process which reconstructs or interpolates the unavailable signal value of $x_n$ at the ith line where the signal values of the lines at i±1, i±3, i±5, . . . are available. More simply, deinterlacing is to interpolate the value of $x_n(i,h)$, which is not originally available. Because $x_{n-1}$ and $x_{n+1}$ have different sampling phase from $x_n$, the signal values of $x_{n-1}(i,h)$ and $x_{n+1}(i,h)$ are available, whereby motion detection can be incorporated with the deinterlacing problem. This relation is depicted by example in FIG. 2, where dotted lines (or, white circles) represent "no data available" 0 and the solid lines (or, black circles) represent "available data".

Figure 3:
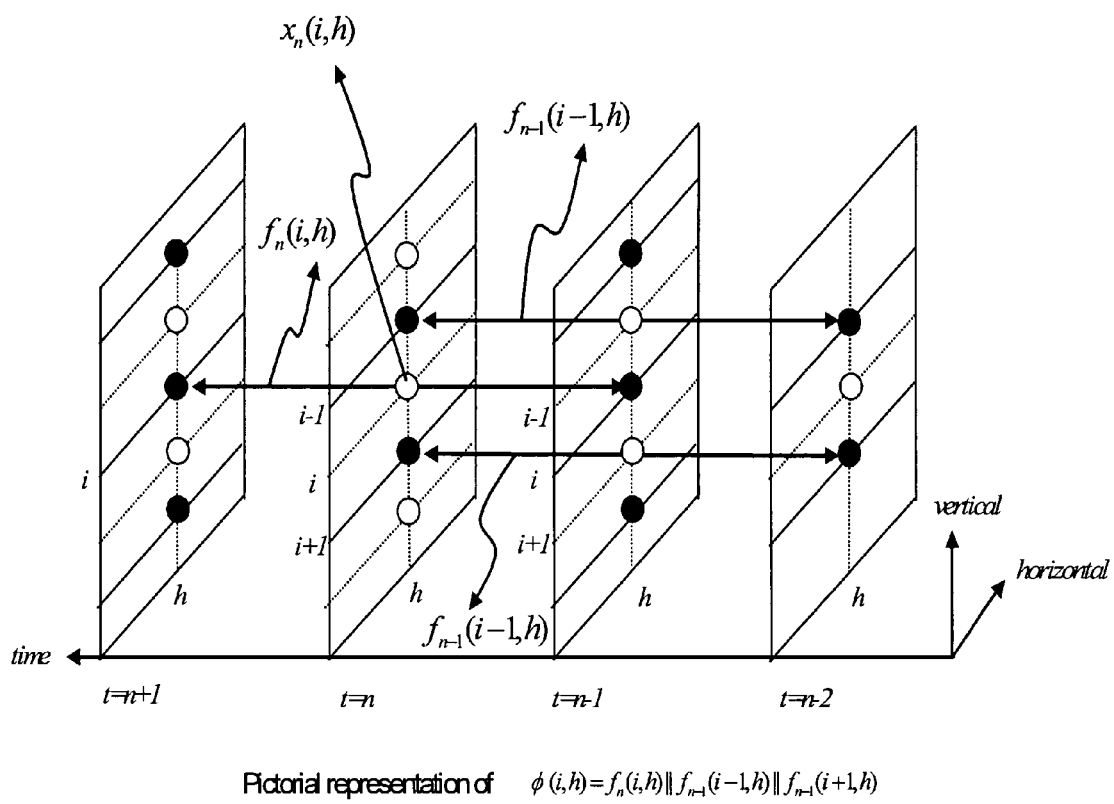
FIG. 3 is a more detailed view illustrating the deinterlacing process according to an embodiment of the present invention.

Referring to FIG. 3, a method of estimating a motion decision parameter $m_n(i,h)$ according to the present invention is now described. Fundamentally, $m_n(i,h)$ is estimated from the incoming interlaced video sequence and associated with the point-to-point degree of motion in the interlaced video sequence. The importance of estimating $m_n(i,h)$ can be easily understood from FIGS. 2 and 3. Assume precise motion detection information is available when interpolating $x_n(i,h)$, and no motion is detected at the spatial location (i,h), then the best interpolation for $x_n(i,h)$ is to use the value of $x_{n-1}(i,h)$. This is because no motion is introduced between t=n−1 and t=n+1 at the spatial location (i,h), implying that the value of $x_n(i,h)$ would be close to the value of $x_{n-1}(i,h)$. The motion decision parameter allows utilizing motion information for deinterlacing, and properly mixing the temporal information described below.

First, the frame difference signal $D_n$ is computed as the difference between the fields in one frame interval as $D_n=|x_{n+1}-x_{n-1}|$ which is associated with a scene change that occurred between the fields $x_{n+1}$ and $x_{n-1}$. The frame difference signal is then low pass filtered as $d_n = LPF(D_n)$ where LPF(108) represents a low pass filtering process over the input video signal.

The M×N kernel ($W_{M \times N}$) of the low pass filter, LPF(108), can be expressed as $$W_{M \times N} = \begin{bmatrix} w_{11} & w_{12} & \cdots & w_{1N} \\ w_{21} & w_{22} & \cdots & w_{2N} \\ \vdots & \vdots & \ddots & \vdots \\ w_{M1} & w_{M2} & \cdots & w_{MN} \end{bmatrix}$$

where ($w_{11}, \ldots, w_{MN}$) represents a set of predetermined normalized coefficients (i.e., $$\sum_{p=1}^{M}\sum_{q=1}^{N} w_{p,q} = 1).$$

Based on the analysis in the commonly assigned patent application titled "Methods to estimate noise variance from a video sequence," filed Nov. 17, 2004, Ser. No. 10/991,265 (incorporated herein by reference), it can be seen that any value $D_n$ in the non-motion region is a random variable with probability density function (p.d.f):

$$p_D(y) = \begin{cases} \dfrac{1}{\sqrt{\pi}\,\sigma_0} \exp\left(-\dfrac{y^2}{4\sigma_0^2}\right) & y > 0 \\ \dfrac{1}{\sqrt{\pi}\,2\sigma_0} & y = 0 \\ 0 & y < 0. \end{cases}$$

The filtered result $d_n$ in the non-motion region is also a random variable with a p.d.f. $p_d(z)$, satisfying:

$$E(d_n(v, h)) = \frac{2}{\sqrt{\pi}}\sigma_0,$$

$$\mathrm{Var}(d_n(v, h)) = \frac{2(\pi-2)}{\pi}\sigma_0^2 \sum_{p=1}^{M}\sum_{q=1}^{N} w_{pq}^2.$$

Figure 4:
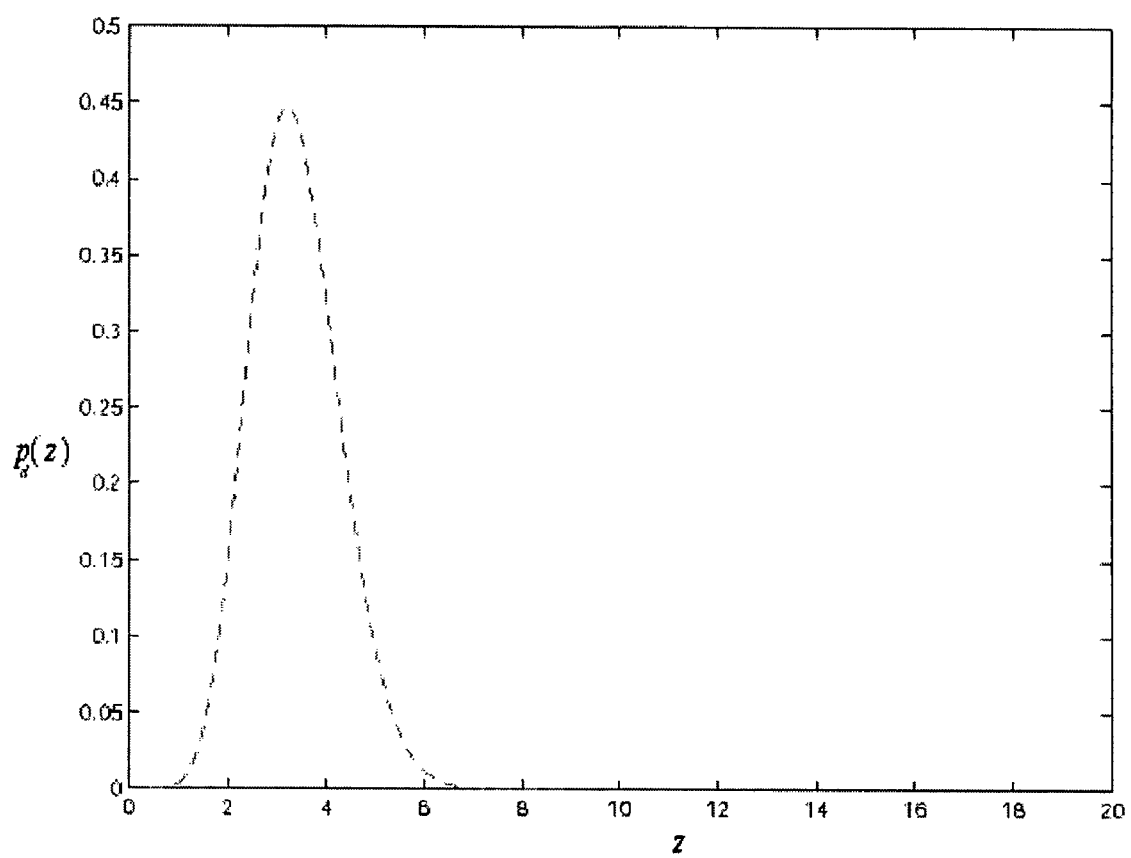
FIG. 4. shows an example distribution of a filtered frame difference according to the present invention.

In one example, if the noise standard deviation is $\sigma_0=3.0$, and the kernel is $$W_{3 \times 3} = \begin{bmatrix} 1/8 & 1/8 & 1/8 \\ 1/8 & 0 & 1/8 \\ 1/8 & 1/8 & 1/8 \end{bmatrix},$$

the p.d.f. $p_d(z)$ is as shown in FIG. 4.

It should be mentioned that LPF(•) can be an all-pass filter depending on the choice of the kernel $W_{M \times N}$. As such, if the kernel is set as M=N=1 and $w_{11}=1$, the LPF(•) becomes the all-pass filter and, thus, $d_n=D_n$.

Figure 5A:
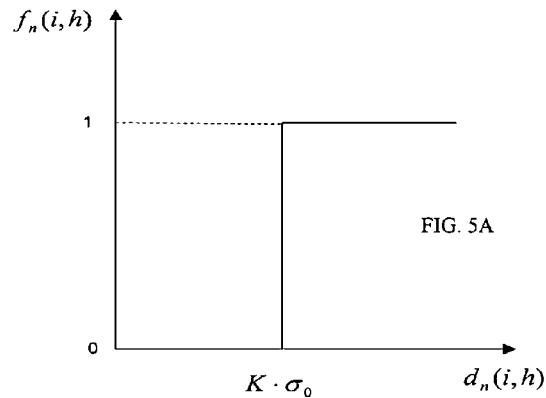
FIGS. 5A-F show examples of calculating a motion decision signal according to the present invention.
Figure 5B:
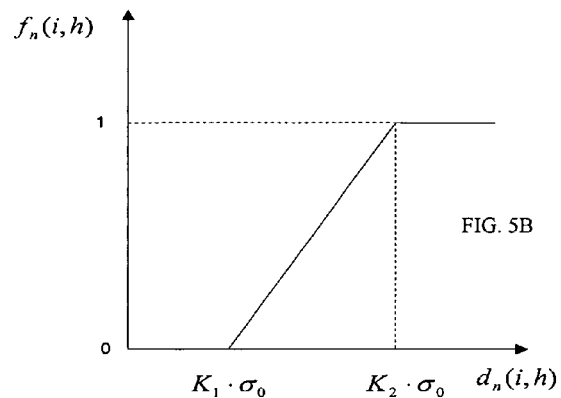
Figure 5C:
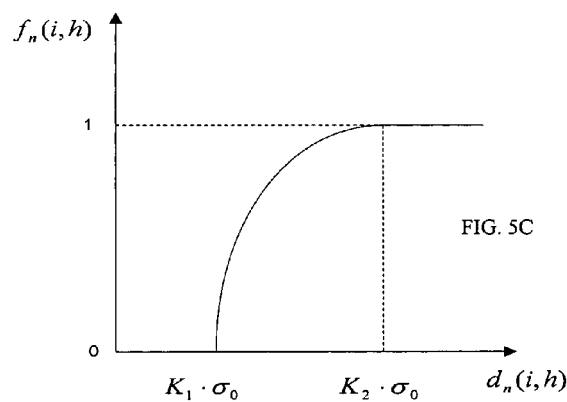
Figure 5D:
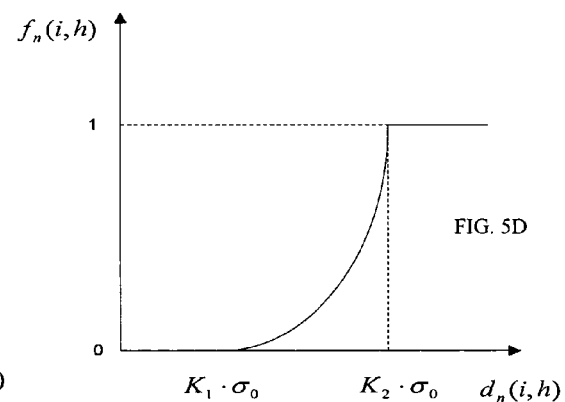
Figure 5E:
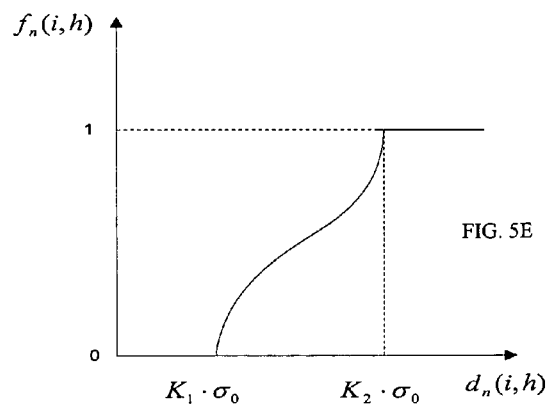
Figure 5F:
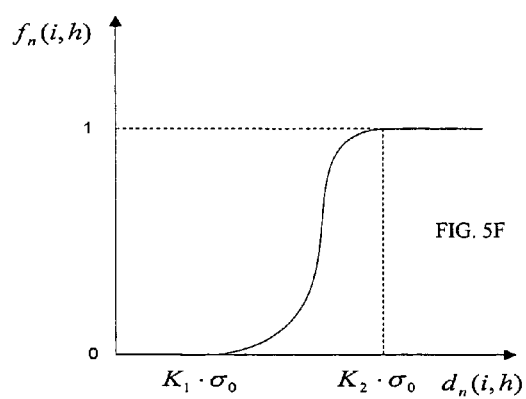

Next, a point-wise motion detection signal is computed as:

if $f_n(i,h)=T_K(d_n(i,h))$tm (1)

where $T_K(\bullet)$ denotes a threshold function. An example implementation of $T_K$(108) can be represented as:

$$T_K(y) = \begin{cases} 1 & \text{if } y > K\sigma_0 \\ 0 & \text{otherwise} \end{cases} \quad (2)$$

in which K is a constant value. The above function $T_K(\bullet)$ outputs hard-switching motion detection signals, illustrated by the example curve in FIG. 5A.

The threshold $K\sigma_0$ is automatically adjusted according to the noise standard deviation of the video sequence. Robust performance can thus be obtained against noise. The value K can be determined by the error probability of detecting a non-motion pixel as a motion pixel:

$$K = \arg_z \int_{z\sigma_0}^{\infty} p_d(z)\,dz = e.$$

Other noise-adaptive methods can also be used for computing soft-switching motion detection signals. From the stochastic characteristic of $d_n(v,h)$, a monotonically increasing curve can be used for implementing the function $T_K(\bullet)$ as illustrated by examples in FIGS. 5B-F.

Then, the point-wise motion detection signal is filtered in spatial and temporal domains to obtain the motion decision parameter $m_n(i,h)$:

$$m_n(i,h) = F(f_n(i,h)).$$

Figure 6:
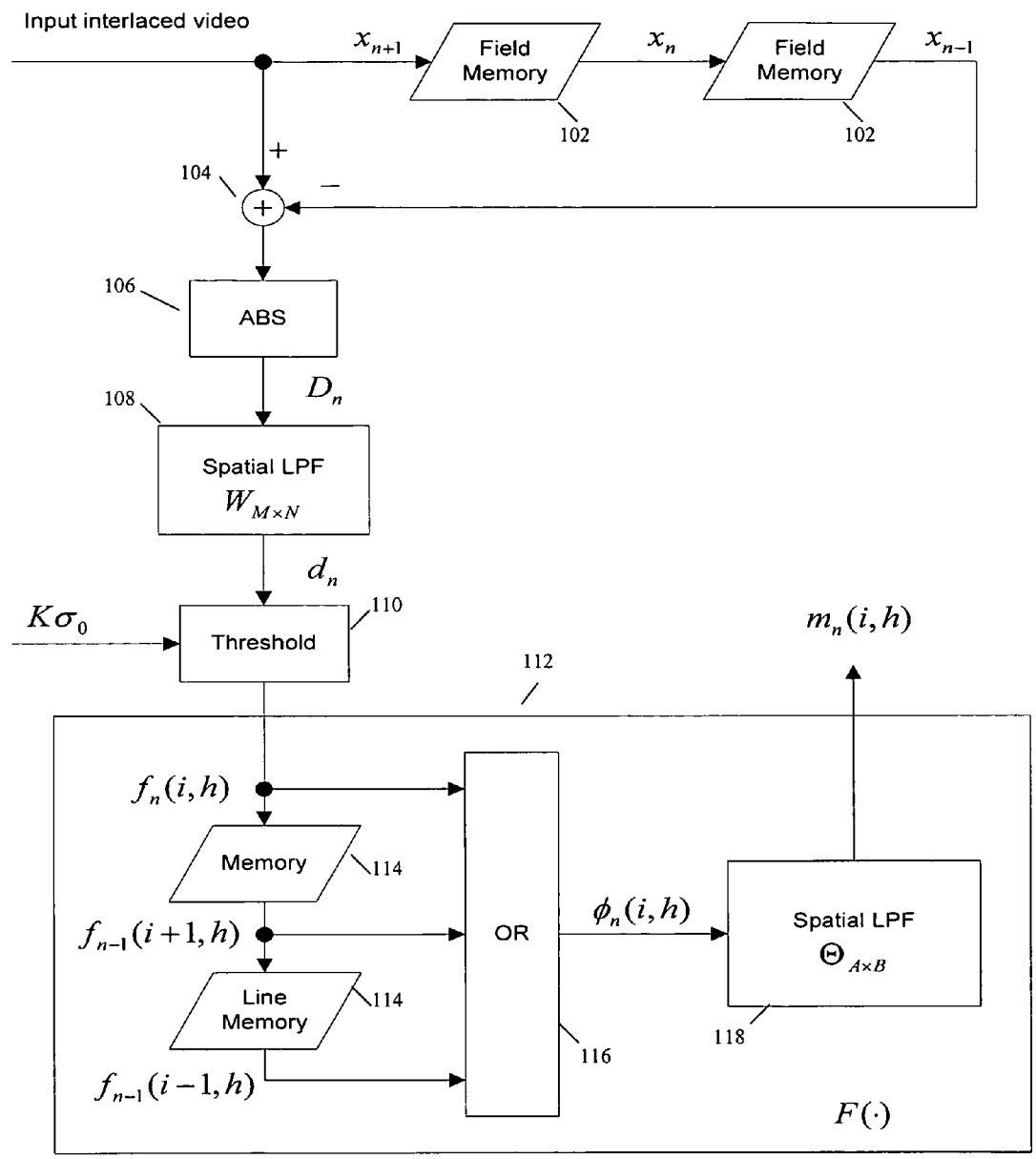
FIG. 6 shows a functional block diagram of an embodiment of a noise-adaptive motion detection that computes a motion decision parameter according to the present invention.

An example implementation of the filter $F(\bullet)$ is shown in FIG. 6 and described further below. In this example, hard-switching point-wise motion detection signal is used. First, the region-wise motion detection signal is computed by a non-linear method as $$\phi_n(i,h) = f_n(i,h) \| f_{n-1}(i-1,h) \| f_{n-1}(i+1,h),$$

where $f_{n-1}(\bullet)$ denotes the one field delayed motion detection signal in relation (1), where the notation $\|$ denotes the logical OR operation. Other methods can be used if soft-switching point-wise motion detection signal is used, such as $$\phi_n(i,h) = \max(f_n(i,h), f_{n-1}(i-1, h), f_{n-1}(i+1,h)).$$

The region-wise motion detection signal is then low-pass filtered to form the motion decision parameter $m_n(i,h)$. The A×B kernel, $\Theta_{A\times B}$, of the low pass-filter can be expressed as $$\Theta_{A\times B} = \begin{bmatrix} \theta_{11} & \theta_{12} & \cdots & \theta_{1B} \\ \theta_{21} & \theta_{22} & \cdots & \theta_{2B} \\ \vdots & \vdots & \ddots & \vdots \\ \theta_{A1} & \theta_{A2} & \cdots & \theta_{AB} \end{bmatrix}$$

where $(\theta_{11}, \ldots, \theta_{AB})$ represents a set of predetermined normalized coefficients (i.e., $$\sum_{p=1}^{A}\sum_{q=1}^{B} \theta_{p,q} = 1).$$

For example, the kernel $\theta_{A\times B}$ can be $$\Theta_{3\times 3} = \begin{bmatrix} 0 & 1/8 & 0 \\ 1/8 & 4/8 & 1/8 \\ 0 & 1/8 & 0 \end{bmatrix}.$$

FIG. 6 shows a function block diagram of a motion decision calculator 100 that computes the motion decision parameter $m_n(i,h)$ using the function $F(\bullet)$ as described above. The motion decision calculator includes field memories 102 that provide sequencing of the interlaced values $x_{n+1}$, $x_n$ and $x_{n-1}$. A summing junction 104 is used along with an absolute value calculator 106 to compute $D_n$ as the difference between the fields in one frame interval as $D_n = |x_{n+1} - x_{n-1}|$ which is associated with a scene change that occurred between the fields $x_{n+1}$ and $x_{n-1}$. Then a spatial LPF filter 108 is used to low-pass filter $D_n$ to obtain $d_n$. Threshold value $K\sigma_0$ is applied to $d_n$ in the noise-adaptive threshold function 110 implementing $T_K$ above. The function $F(\bullet)$ is implanted in a filter 112, in which memories 114 allow sequencing of the values $f_{n-1}(\bullet)$, and an OR junction 116 provides the region-wise motion detection signal $\phi_n(i,h) = f_n(i,h) \| f_{n-1}(i-1,h) \| f_{n-1}(i+1,h)$. The region-wise motion detection signal is low-pass filtered in the LPF filter 118 to generate the motion decision parameter $m_n(i,h)$.

Figure 7:
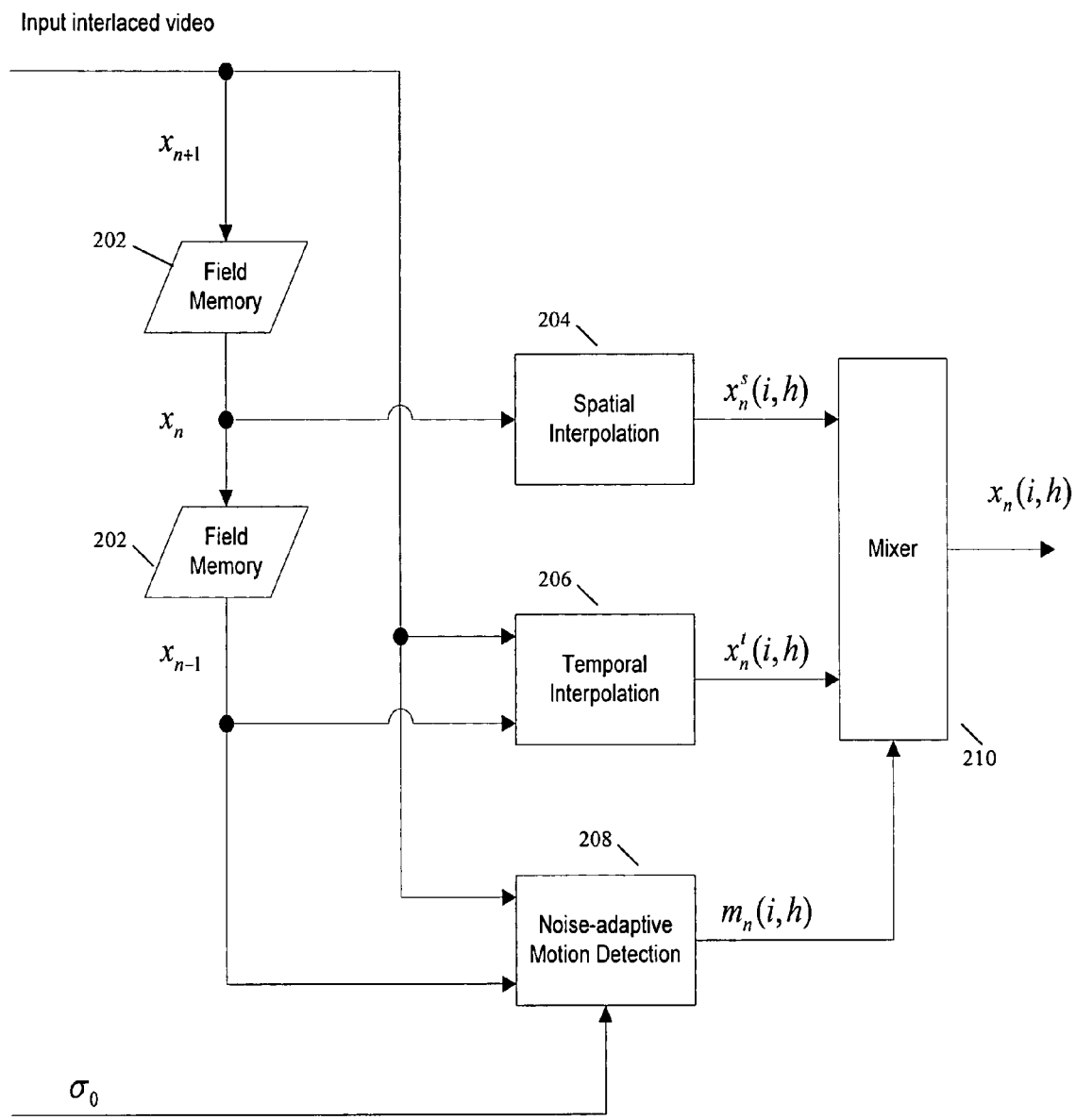
FIG. 7 shows a functional block diagram of a deinterlacing system according to an embodiment of the present invention.

The computed motion decision parameter $m_n(i,h)$ can then used to mix a spatially interpolated signal and a temporally interpolated signal. FIG. 7 shows a block diagram of an embodiment of an interpolator 200 for interpolating the value of $x_n(i,h)$ for the interlaced video sequence. The interpolator 200 comprises filed memories 202, a spatial interpolator 204, a temporal interpolator 206, a motion decision processor 208, and a mixer 210. Field memories 202 sequence the interlaced values $x_{n+1}$, $x_n$, and $x_{n-1}$.

The spatial interpolator 204 spatially interpolates the value of $x_n(i,h)$ by using a predetermined algorithm. The temporal interpolator 206 temporally interpolates the value of $x_n(i,h)$ by using a predetermined algorithm. The motion decision processor 208 computes the motion decision value, $m_n(i,h)$, as described above (e.g. FIG. 6), representing the degree of the motion at the interpolation location (i,h).

Conceptually, the value of the motion decision parameter is bounded as $0 \leq m_n(i,h) \leq 1$, wherein $m_n(i,h) = 0$ implies "no motion" and $m_n(i,h) = 1$ implies "motion". The mixer 210 mixes the output signal of the spatial interpolator 204 and the output signal of the temporal interpolator 206 in accordance with the motion decision value $m_n(i,h)$. Denoting $x_n^s(i,h)$ and $x_n^t(i,h)$ as the output signals of the spatial interpolator 204 and the temporal interpolator 206, respectively, then the output signal of the mixer 210 (i.e., the interpolated signal) is represented as $$x_n(i,h) = (1 - m_n(i,h)) \cdot x_n^t(i,h) + m_n(i,h) \cdot x_n^s(i,h). \text{tm (3)}$$

Note that $x_n(i,h) = x_n^t(i,h)$ when $m_n(i,h) = 0$ (no motion), and $x_n(i,h) = x_n^s(v,h)$ when $m_n(i,h) = 1$ (motion).

In the example of FIG. 7, the spatial and temporal interpolating algorithms can be selected freely because the present invention is directed to estimating the motion decision value $m_n(i,h)$ based on the noise standard deviation, and mixing of a spatially interpolated signal and a temporally interpolated signal in accordance with the estimated motion decision value.

Examples of the spatially interpolated signal $x_n^s(v,h)$ are $$x_n^s(i,h) = (x_n(i-1,h) + x_n(i+1,h))/2,$$

which corresponds to a line average, and $$x_n^s(i,h) = x_n(i-1,h)$$

which corresponds to a method known as line doubling. Examples of temporally interpolated signal $x_n^t(v,h)$ are $$x_n^t(i,h) = (x_{n+1}(i,h) + x_{n-1}(i,h))/2$$

and $$x_n^t(i,h) = x_{n-1}(i,h).$$

The present invention has been described in considerable detail with reference to certain preferred versions thereof; however, other versions are possible. Therefore, the spirit and scope of the appended claims should not be limited to the description of the preferred versions contained herein.

What is claimed is:

1. In a video signal processing system, a method of computing a motion decision value, comprising the steps of:
   inputting a video signal with an interlaced video sequence of fields;
   computing a frame difference signal from a difference between a previous field and a next field in the video sequence;
   computing a point-wise motion detection signal based on the frame difference signal and noise in the video sequence, wherein the point-wise motion detection signal is noise-adaptive; and
   computing the motion decision value as a function of the point-wise motion detection signal,
   wherein computing the point-wise motion detection signal further computes the point-wise motion detection signal based on a noise adaptive threshold function operating on the frame difference signal, and wherein the steps of computing the point-wise motion detection signal comprises computing $$f_n(i,h) = T_K(d_n(i,h)),$$

where $f_n(\bullet)$ is a point-wise motion detection signal, i and h define a spatial location of the respective video signal value in a cartesian matrix, and $T_K(\bullet)$ denotes the noise-adaptive threshold function.

2. The method of claim 1 wherein the step of calculating the point-wise motion detection signal further includes the steps of:
   comparing the frame difference signal to a threshold value;
   forming the point-wise motion detection signal based on the comparison results.

3. The method of claim 1 wherein the step of computing the motion decision value further includes the steps of:
   filtering the point-wise motion detection signal in spatial and temporal domains; and
   forming the motion decision value as a function of the filtered point-wise motion detection signal.

4. The method of claim 3 wherein the step of filtering the point-wise motion detection signal in spatial and temporal domains comprises the steps of:
   computing a region-wise motion detection signal from the point-wise motion detection signal an adjacent point-wise motion detection signal delayed by one field.

5. The method of claim 4 wherein the step of forming the motion decision value further comprises the steps of forming the motion decision value as a function of the region-wise motion detection signal.

6. The method of claim 5 wherein the step of forming the motion decision value further comprises the steps of low-pass filtering the region-wise motion detection signal to form the motion decision value.

7. The method of claim 1 further including the steps of low-pass filtering the difference signal prior to the step of computing the point-wise motion detection signal.

8. The method of claim 1 wherein:

$$T_K(y) = \begin{cases} 1 & \text{if } y > K\sigma_0 \\ 0 & \text{otherwise} \end{cases},$$

where K is a constant value and $\sigma_0$ represents noise standard deviation.

9. The method of claim 1, wherein $T_K(\bullet)$ comprises a monotonically increasing function.

10. The method of claim 1, wherein the step of computing the motion decision value as a function of the point-wise motion detection signal comprises computing $$m_n(i,h) = F(f_n(i,h))$$

where $m_n(i,h)$ is the motion decision value and $F(\bullet)$ comprises a filtering function.

11. The method of claim 10 wherein the filtering process $F(\bullet)$ comprises the steps of:
   computing a region-wise motion detection signal as $$o_n(i,h) = f_n(i,h) \| f_{n-1}(i-1, h) \| f_{n-1}(i+1, h),$$

where $f_{n-1}(\bullet)$ denotes a one field delayed motion detection signal, and the notation $\|$ denotes the logical OR operation;
   low-pass filtering the region-wise motion detection signal to form the motion decision value $m_n(i,h)$.

12. In a video signal processing system, an apparatus for computing a motion
   decision value, comprising:
   an input for receiving a video signal with an interlaced video sequence;
   difference forming means that computes a frame difference signal from a difference between a previous field and a next field in the video sequence;
   means for forming a point-wise motion detection signal based on the frame difference signal and noise in the video sequence, wherein the point-wise motion detection signal is noise-adaptive based on a noise standard deviation of the video signal; and
   forming the motion decision value as a function of the point-wise motion detection signal based on a noise adaptive threshold function operating on the frame difference signal,
   wherein the means for-forming the point-wise motion detection signal is programmed to compute $$f_n(i,h) = T_K(d_n(i,h)),$$

where $f_n(\bullet)$ is a point-wise motion detection signal, i and h define a spatial location of the respective video signal value in a cartesian matrix, and $T_K(\bullet)$ denotes the noise-adaptive threshold function.

13. The apparatus of claim 12 wherein the forming the point-wise motion detection signal forms the point-wise motion detection signal by further comparing the frame difference signal to a threshold value, and generating the point-wise motion detection signal based on the comparison results.

14. The apparatus of claim 12 wherein the forming the motion decision value further comprises:
   filter means for filtering the point-wise motion detection signal in spatial and temporal domains; and means for forming the motion decision value as a function of the filtered point-wise motion detection signal.

15. The apparatus of claim 14 wherein in filtering the point-wise motion detection signal in spatial and temporal domains, the filter means further computes a region-wise motion detection signal from the point-wise motion detection signal an adjacent point-wise motion detection signal delayed by one field.

16. The apparatus of claim 15 wherein the forming the motion decision value further forms the motion decision value as a function of the region-wise motion detection signal.

17. The apparatus of claim 16 the forming the motion decision value further comprises a low-pass filter for filtering the region-wise motion detection signal to form the motion decision value.

18. The apparatus of claim 12 further including a low-pass filter for low-pass filtering the difference signal prior to forming the point-wise motion detection signal.

19. The apparatus of claim 12 wherein:

$$T_K(y) = \begin{cases} 1 & \text{if } y > K\sigma_0 \\ 0 & \text{otherwise} \end{cases},$$

where K is a constant value and $\sigma_0$ represents noise standard deviation.

20. The apparatus of claim 12 wherein $T_K(\bullet)$ comprises a monotonically increasing function.

21. The apparatus claim 12 wherein the forming the motion decision value as a function of the point-wise motion detection signal is programmed to compute $$m_n(i,h) = F(f_n(i,h))$$

where $m_n(i,h)$ is the motion decision value and $F(\bullet)$ comprises a filter.

22. The apparatus of claim 21 wherein the $F(\bullet)$ filter comprises:

means for forming a region-wise motion detection signal as $$\phi_n(i,h) = f_n(i,h) \| f_{n-1}(i-1,h) \| f_{n-1}(i+1,h),$$

where $f_{n-1}(\bullet)$ denotes a one field delayed motion detection signal, and the notation $\|$ denotes the logical OR operation; and a low-pass filter for low-pass filtering the region-wise motion detection signal to form the motion decision value $m_n(i,h)$.

23. In a video signal processing system, a method of computing a motion decision value, comprising the steps of:

inputting a video signal with an interlaced video sequence of fields;

computing a frame difference signal from a difference between a previous field and a next field in the video sequence;

computing a point-wise motion detection signal based on the frame difference signal and noise in the video sequence, wherein the point-wise motion detection signal is noise-adaptive; and computing the motion decision value as a function of the point-wise motion detection signal, wherein computing the point-wise motion detection signal comprises computing $$f_n(i,h) = T_K(d_n(i,h))$$

where $f_n(\bullet)$ is a point-wise motion detection signal, i and h define a spatial location of the respective video signal value in a cartesian matrix, and $T_K(\bullet)$ denotes a noise-adaptive threshold function.

24. A method of processing interlaced video signals, comprising the steps of:

spatially interpolating a value of the video signal at a given location from a video signal of at least one adjacent location in a given video field;

temporally interpolating the value of the video signal at the given location from a video signal at the same location in temporally adjacent video fields;

forming a motion decision value for the same location in accordance with claim 23; and mixing an output signal for the video signal at the given location from the spatially interpolated signal and the temporally interpolated signal and weighting the output signal in accordance with the motion decision value.

25. In a video signal processing system, an apparatus for computing a motion decision value, comprising:

an input for receiving a video signal with an interlaced video sequence;

difference forming means that computes a frame difference signal from a difference between a previous field and a next field in the video sequence;

means for forming a point-wise motion detection signal based on the frame difference signal and noise in the video sequence, wherein the point-wise motion detection signal is noise-adaptive; and means for forming the motion decision value as a function of the point-wise motion detection signal, wherein the means for forming point-wise motion detection signal is programmed to compute $$f_n(i,h) = T_K(d_n(i,h))$$

where $f_n(\bullet)$ is a point-wise motion detection signal, i and h define a spatial location of the respective video signal value in a cartesian matrix, and $T_K(\bullet)$ denotes a noise-adaptive threshold function 26. An apparatus of processing interlaced video signals, comprising:

an input for receiving a video signal with an interlaced video sequence of fields;

a spatial interpolator connected to said input and configured for spatially interpolating a value of the video signal at a given location from a video signal of at least one adjacent location in a given video field;

a temporal interpolator connected to said input in parallel with said spatial interpolator for temporally interpolating the value of the video signal at the given location from a video signal at the same location in temporally adjacent video fields;

a computing apparatus according to claim 25 connected to said input and in parallel with said spatial interpolator and said temporal interpolator for forming a motion decision value for the same location; and a mixer connected to receive an output signal from each of said spatial interpolator, said temporal interpolator, and said computing apparatus, said mixer configured for mixing an output signal for the video signal at the given location from the spatially interpolated signal and the temporally interpolated signal based on the motion decision value output by said computing apparatus.

* * * * *